US007318875B2

(12) United States Patent
Kruchko

(10) Patent No.: US 7,318,875 B2
(45) Date of Patent: Jan. 15, 2008

(54) SYSTEM AND METHOD FOR MANUFACTURING A PUBLICATION

(75) Inventor: Steven N. Kruchko, Western Springs, IL (US)

(73) Assignee: Stromberg Allen & Company, Chicago, IL (US)

( * ) Notice: Subject to any disclaimer, the term of this patent is extended or adjusted under 35 U.S.C. 154(b) by 323 days.

(21) Appl. No.: 11/040,909

(22) Filed: Jan. 21, 2005

(65) Prior Publication Data

US 2005/0161150 A1 Jul. 28, 2005

Related U.S. Application Data

(60) Provisional application No. 60/538,835, filed on Jan. 22, 2004, provisional application No. 60/567,843, filed on May 3, 2004.

(51) Int. Cl.
*B32B 37/12* (2006.01)
*B32B 37/22* (2006.01)
*B32B 38/04* (2006.01)
*B32B 38/14* (2006.01)
*B41M 1/00* (2006.01)

(52) U.S. Cl. ...................... 156/182; 156/227; 156/252; 156/253; 156/265; 156/269; 156/273.1; 156/277; 156/279; 270/32; 270/45; 270/52.14

(58) Field of Classification Search ................ 156/227, 156/250, 252, 265, 273.1, 277, 279
See application file for complete search history.

(56) References Cited

U.S. PATENT DOCUMENTS 5,477,784 A 12/1995 Floegel
5,560,799 A 10/1996 Jacobsen
6,143,255 A 11/2000 Cowell Senft
6,284,339 B1 9/2001 Floegel et al.
6,402,132 B1 6/2002 Michaelis
6,551,228 B1 4/2003 Richards
2001/0048862 A1* 12/2001 Baumann et al. .............. 412/4
2002/0064762 A1* 5/2002 Avery et al. .................. 434/81
2004/0202820 A1* 10/2004 Bharti ........................ 428/137

OTHER PUBLICATIONS

Internation search report and written report for PCT/US05/02037 mailed Nov. 8, 2006.

ElectroCard 3G and Electro Splice product brochure downloaded from http://www.hurfetron.com/.

* cited by examiner

*Primary Examiner*—Melvin Mayes
(74) *Attorney, Agent, or Firm*—McAndrews, Held & Malloy, Ltd.

(57) ABSTRACT

A method of manufacturing a publication including uniting a printed paper web with a printed film web to form a combined web, forming at least one signature sheet from the combined web, and folding the signature sheet to form a signature, wherein the signature comprises a plurality of pages of the publication with film material sandwiched therebetween.

20 Claims, 10 Drawing Sheets

SYSTEM AND METHOD FOR MANUFACTURING A PUBLICATION

RELATED APPLICATIONS

The present application relates to and claims priority from U.S. Provisional Application No. 60/538,835, entitled "System and Method for Manufacturing a Publication," which was filed on Jan. 22, 2004, and is hereby incorporated by reference in its entirety. The present application also relates to and claims priority from U.S. Provisional Application No. 60/567,843, entitled "System and Method for Manufacturing a Publication," which was filed on May 3, 2004, and is hereby incorporated by reference in its entirety.

BACKGROUND OF THE INVENTION

Embodiments of the present invention generally relate to an improved system and method for manufacturing a publication, such as a telephone directory or magazine. In particular, embodiments of the present invention relate to a system and method for inserting an electro-statically charged film, such as an electret, between pages of the publication.

Many publications are manufactured to include advertisements and reference information. Individuals often desire to have such information, such as a phone number for pizza delivery, for quick and easy reference. As such, some publications include paper ads that may be torn out from the publication. An individual may then affix the advertisement to a convenient surface through tape, tacks, or the like. Further, the advertisement may be affixed to a magnetic surface (e.g., a refrigerator door) through the use of a magnet. In fact, some publications, such as phone books, include magnetic advertisements contained therein that an individual may remove and affix to a surface.

The process of manufacturing such publications, however, may be costly and time consuming. Additionally, the size of the publication may be excessively large due to the fact that multiple advertisements are contained therein.

Thus, a need exists for a more efficient system and method of manufacturing a publication having removable advertisements or other information.

BRIEF SUMMARY OF THE INVENTION

Certain embodiments of the present invention provide a method of manufacturing a publication including uniting a paper web with a film web to form a combined web, forming at least one signature sheet from the combined web, and folding the signature sheet to form a signature, wherein the signature comprises a plurality of pages of the publication with film material sandwiched therebetween. The film web may be an electret web that is thicker than the paper web, which, in turn, may be wider than the film web. Alternatively, the paper web may be thicker than the film web, such as an electret web, and the film web may be wider than the paper web. In general, the film and paper webs may be various shapes, sizes, and thicknesses. The film web overlays a portion of the paper web to form the combined web. The film web may also include a glue region that is configured for binding the signatures together. The film web may not contact the glue region.

The method may also include printing on at least one side of the paper web, and printing on at least one side of the film web. The method may also include forming a thin layer of fugitive glue on the printed paper web, and perforating the printed film web so that individual portions of the printed film web are configured to be removed from a main body of the printed film web. The method may also include applying a layer of spray powder to the film web.

Certain embodiments of the present invention may also provide a method of manufacturing a publication including sandwiching an electrostatic film web between two paper webs to form a combined web, and forming at least one signature from the combined web, wherein the signature comprises a plurality of pages of the publication with film material sandwiched therebetween. The method may also include folding at least one signature sheet to form the at least one signature. Further, the method may include punching holes in the two paper webs and the film web; and wherein the sandwiching step includes registering the film web with the two paper webs through the punched holes. Removable individual electrostatic film portions may be defined within the electrostatic film web.

Certain embodiments of the present invention also provide a method of manufacturing a publication including separating an electrostatically-charged film web into individual film portions, registering the individual film portions with a paper web to form a combined web, and forming at least one signature from the combined web, wherein the signature comprises a plurality of pages of the publication with film material sandwiched therebetween. The method may also include defining removable electrostatic units within the individual film portions, applying a layer of spray powder to the electrostatically-charged film web, wherein the registering includes aligning holes formed through the individual film portions with features of the paper web.

Figure 1:
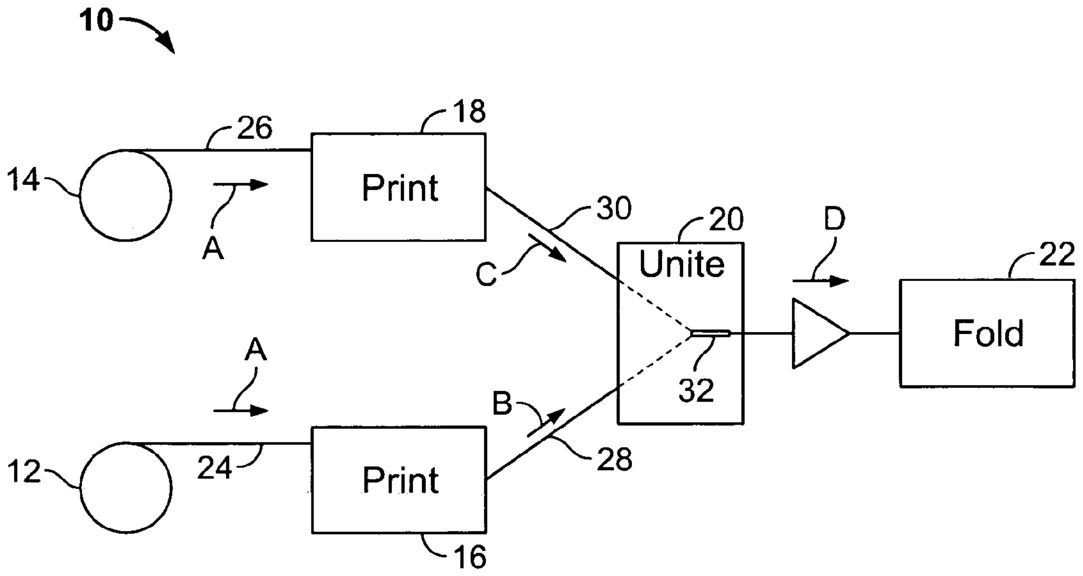
FIG. 1 illustrates a simplified representation of a publication manufacturing system according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a simplified representation of a publication manufacturing system 10 according to an embodiment of the present invention. The system 10 includes a paper roll 12, a statically-charged film (such as electret) roll 14, a paper printing apparatus 16, a static film printing apparatus 18, a uniting apparatus 20, and a folder 22.

The paper roll 12 supplies a paper web 24 to the paper printing apparatus 16 in the direction of arrow A. The paper web 24 has a thickness that is preferably less than or equal to the thickness of an electret or otherwise electrostatic film (statically-charged) web. Paper sheets derived from the paper web 24 may be used in books, treatises, directories, magazines, or the like. In particular, the paper sheets may be bound within a telephone directory.

The statically-charged roll 14 provides an electrostatic film web 26 to the statically-charged printing apparatus 18 in the direction of arrow A. The film web 26 has a thickness that is preferably between 1 millimeter and 3 millimeters. The film web 26 is configured to stick or cling to the surface of the paper web 24. The film web 26 carries a permanent electrostatic charge. The film web 26 is adapted to stick to most surfaces due to its permanent electrostatic charge. Statically-charged sheets do not permanently stick or cling to a surface. Instead, statically-charged sheets may be positioned on a surface, removed from the surface, and re-positioned to the surface (or another surface) at a user's discretion.

The paper printing apparatus 16 prints text, images, and the like on the paper web 24 as it passes therethrough. Similarly, the static film printing apparatus 18 prints text, images, and the like on the statically-charged web 26 as it passes therethrough. The paper printing apparatus 16 may print information on the paper web 24 such as telephone numbers associated with individuals, yellow page information, and the like. Similarly, the static film printing apparatus 18 may print information on the statically-charged web 26 such as telephone numbers associated with individuals, yellow page information, and the like. Certain embodiments of the present invention provide a printed statically-charged web that includes business information. For example, the printed statically-charged web may include advertisement information for a business entity that an individual may remove from a telephone directory and position on a wall, refrigerator, or the like, for quick and easy reference.

A printed paper web 28 passes through the paper printing apparatus 16 and passes to the uniting apparatus 20 in the direction of arrow B. Similarly, a printed film web 30 passes through the static film printing apparatus 18 and passes to the uniting apparatus 20 in the direction of arrow C. The uniting apparatus 20 then aligns the printed film web 30 with the printed paper web 28 and unites the two together. That is, the uniting apparatus 20 acts to bring the printed film web 30 into contact with the printed paper web 28. As the printed film web 30 contacts the printed paper web 28, the electrostatic charge of the printed film web 30 causes it to stick or otherwise cling to the surface of the printed paper web 28 to form a combined web 32 that is then passed to the folder 22 in the direction of D.

Figure 2:
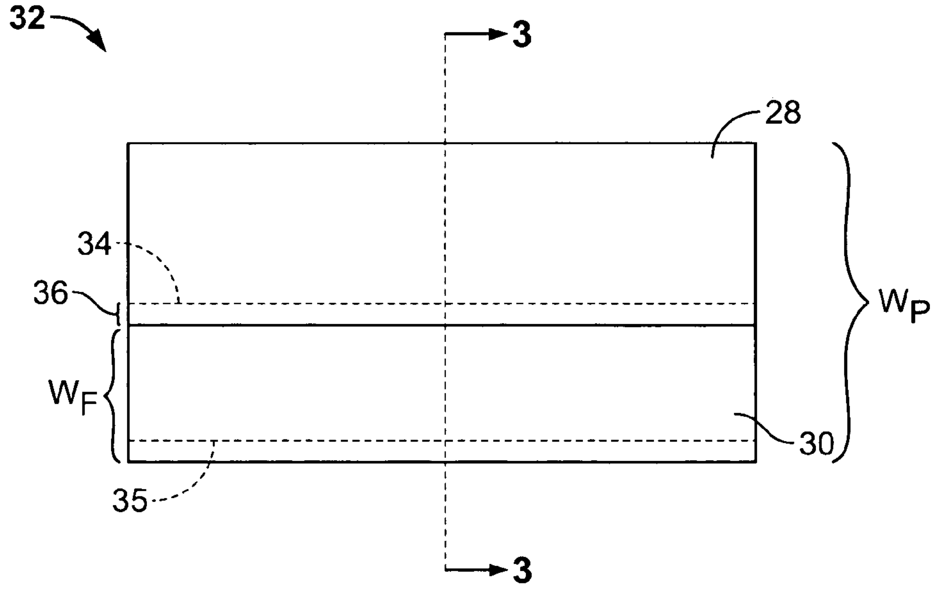
FIG. 2 illustrates a plan view of a combined web of paper and statically-charged film according to an embodiment of the present invention.

FIG. 2 illustrates a plan view of the combined web 32. The combined web 32 includes the printed paper web 28 and the printed film web 30. As shown in FIG. 2, the width $W_F$ of the printed film web 30 may be less than or equal to half the width $W_P$ of the printed paper web 28.

Figure 3:
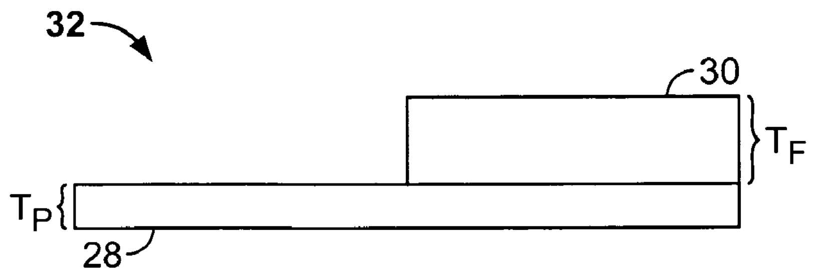
FIG. 3 illustrates a cross-sectional view of the combined web through line 3-3 of FIG. 2.

FIG. 3 illustrates a cross-sectional view of the combined web 32 through line 3-3 of FIG. 2. The thicknesses of the printed paper web 28 and the printed film web 30 have been exaggerated for illustrative purposes. As shown in FIG. 3, the printed film web 30 overlays a portion of the printed paper web 28. Further, the thickness $T_F$ of the printed film web 30 may be greater than the thickness $T_P$ of the printed paper web 28. The thickness $T_F$ may be approximately 3 millimeters, while the thickness $T_P$ may be approximately 2 millimeters.

Referring again to FIG. 2, glue may be placed along a portion of the printed paper web 28. The glue may be permanent or non-permanent fugitive glue. The glue is applied after the printing process, but may, alternatively, be applied prior to the printing process. In general, the glue is applied prior to the uniting of the film and paper web as shown in FIG. 1. A gap 36 is formed between a centerline fold 34 and the printed film web 30 such that the printed film web 30 does not contact the centerline fold 34, which eventually becomes part of the spine of the book.

Alternatively, a printed film web having a greater width, such as equal to that of the printed paper web, may overlay the printed paper web. In this case, the printed film web does contact the centerline fold 34. The printed film web is then die cut lengthwise at positions proximate the centerline fold 34 such that portions of the printed film web, which are not in contact with the centerline fold 34, may be easily removed.

Referring again to FIG. 1, once the uniting apparatus 20 forms the combined web 32, the combined web 32 is passed to the folder 22. The combined web 32 is cut by a tool, which may be housed within the folder 22, to form a signature sheet. The folder 22 folds the combined web 32 to form a signature. A signature represents a unit of a publication. For example, a signature may be a portion of a phone book.

Figure 4:
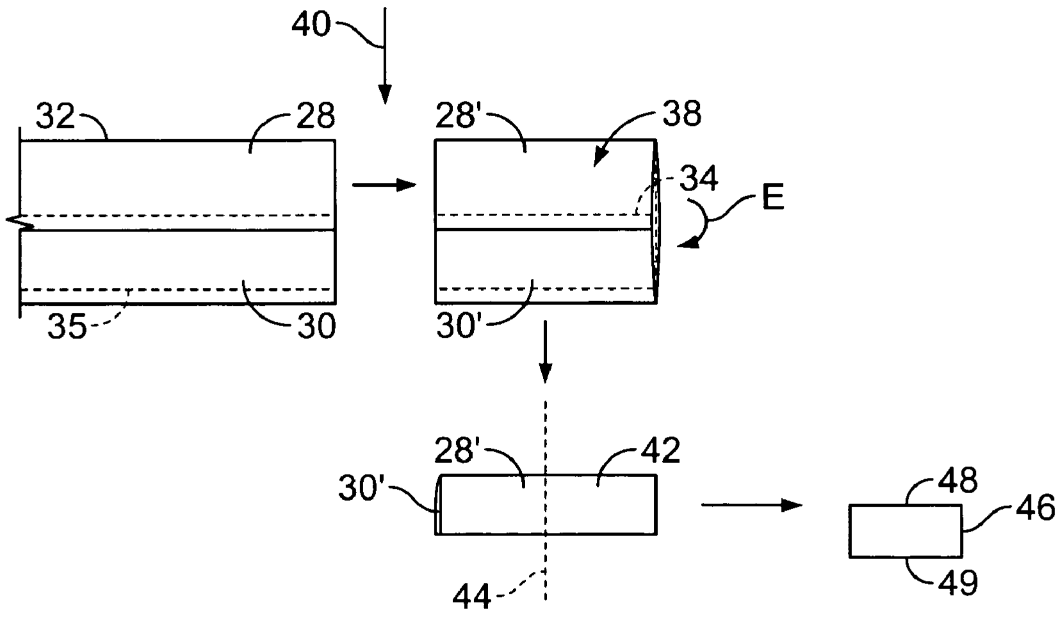
FIG. 4 illustrates a signature forming process according to an embodiment of the present invention.

FIG. 4 illustrates a signature forming process according to an embodiment of the present invention. The combined web 32 is cut into a signature sheet 38 by a cutting tool 40. The folder 22 then folds the signature sheet 38 along the centerline 34 in the direction of E to form a preliminary signature 42, thereby sandwiching the printed film portion 30' within the folded printed paper portion 28'. The preliminary signature 42 is then folded along a perpendicular (with respect to the centerline 34) centerline 44, thereby producing a signature 46. The signature sheet 38 may be folded more or less than that shown to form the signature 46. The signature sheet 46 is folded such that any glue is at the bottom edge 48 and/or an edge that forms a face edge of a publication. Edge 48 forms the spine edge of the publication (hereinafter the "glue edge"). The glue edge 48 is ground and glued together with other signatures and the cover to form the spine of the publication (not shown).

Figure 5:
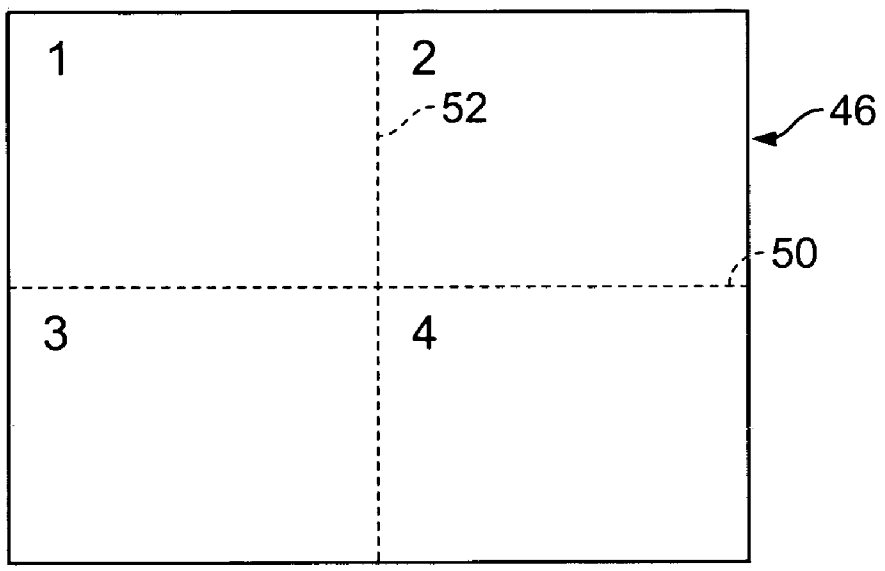
FIG. 5 illustrates an unfolded signature according to an embodiment of the present invention.

FIG. 5 illustrates an unfolded signature 46 according to an embodiment of the present invention. As noted above, a signature sheet 38 is folded to form the signature 46. Once the signature 46 is unfolded, it may be considered an unfolded signature 46. As shown in FIG. 5, a signature sheet 46 folded as discussed above produces 8 pages (the printed paper web is printed on both sides) of printed pages with an statically-charged film portion positioned therebetween. That is, the boundaries of the folds 50 and 52 define pages 1, 2, 3, and 4. Because the signature sheet 46 is printed on both sides, 8 pages of printed materials are produced. Optionally, the printed paper web 28 and the printed film web 30 may be printed on only one side.

A plurality of signatures 46 are collated according to the sequence of pages of a publication. Once the signatures 46 are collated, the glue edges 48 of the signatures 46 are ground to neatly form the spine of the publication. The outer edges, such as an outer glue edge that form the face edge of a publication, of the signatures are then trimmed to remove excess material, such as a glue line and excess paper and web material. Thus, a publication having statically-charged film pages sandwiched between printed paper pages is formed. Because the statically-charged film pages are not glued within the publication, but rather cling to the printed paper pages, the statically-charged film pages may be easily removed from the publication. The statically-charged film pages may then be positioned on a wall, refrigerator door, or the like.

Figure 6:
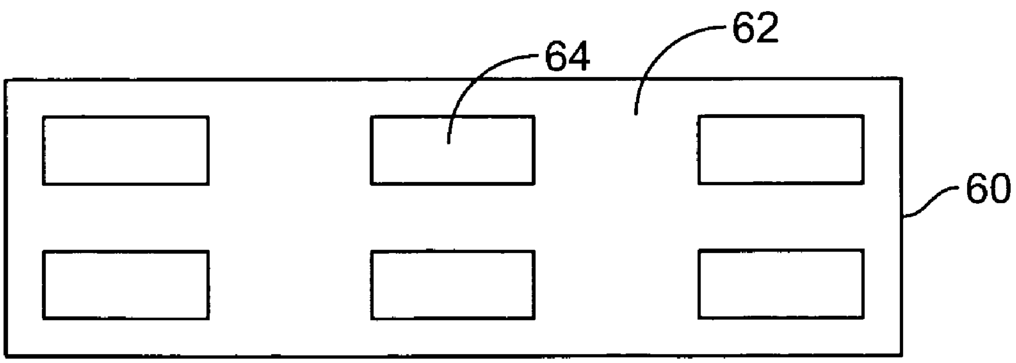
FIG. 6 illustrates a printed film web according to an alternative embodiment of the present invention.

FIG. 6 illustrates a printed film web 60 according to an alternative embodiment of the present invention. The printed film web 60 includes a main body 62 that has been die cut by a tool such that individual portions 64 are defined therein. The individual portions 64 may be separate advertisements or coupons that may be removed from the main body 62. Before the printed film web 60 is united with the printed paper web 28, the printed paper web 28 may be coated with a thin film of fugitive, i.e., non-permanent, glue. A publication having signatures including material derived from the printed film web 60 allows an individual to remove the individual portions 64 while the main body 62 remains within the publication.

Figure 7:
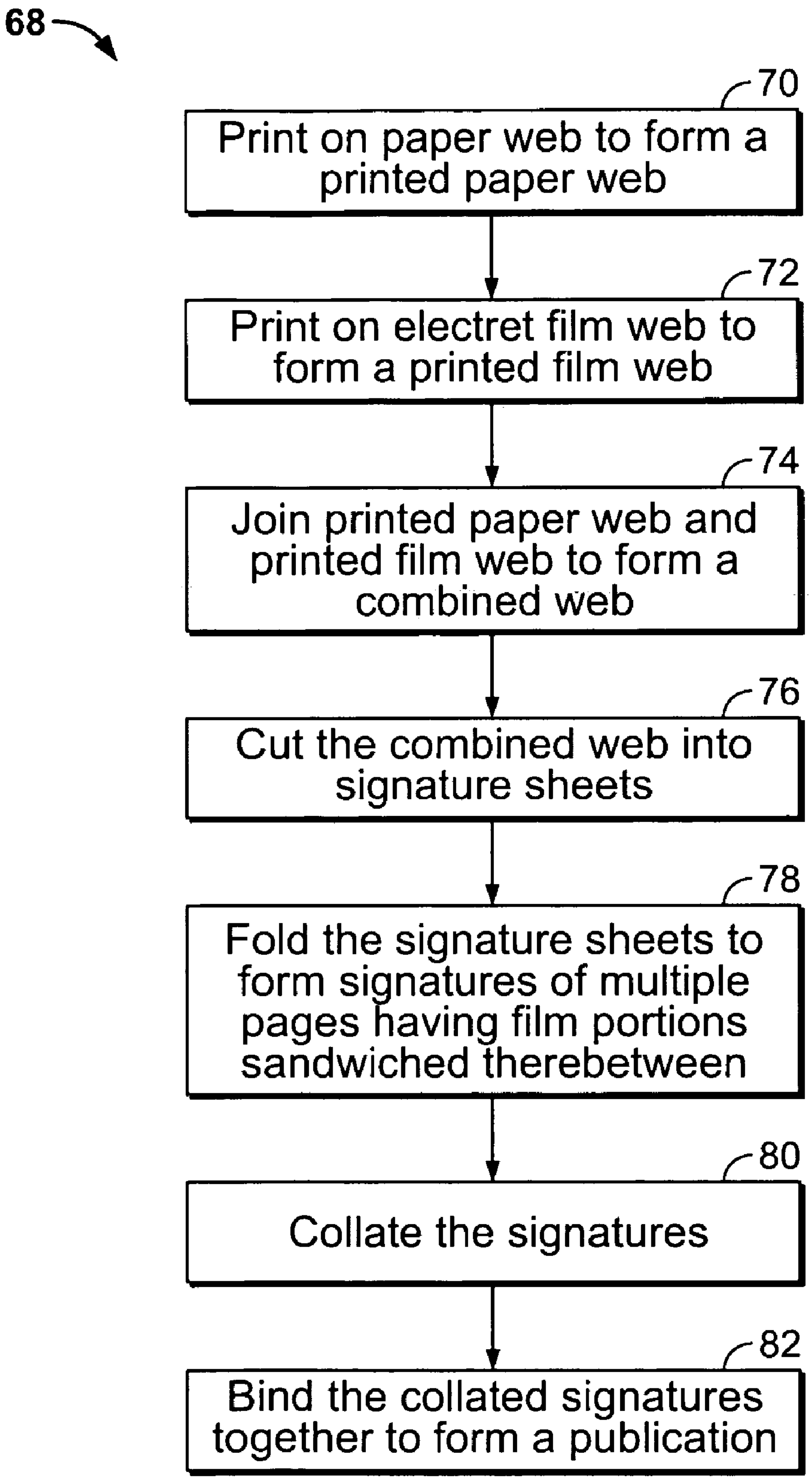
FIG. 7 illustrates a flow chart for a method of manufacturing a publication according to an embodiment of the present invention.

FIG. 7 illustrates a flow chart for a method 68 of manufacturing a publication according to an embodiment of the present invention. At 70, a paper web is printed. Similarly, a film web is printed at 72. The paper web and the film web are joined at 74 such that the film web clings to the paper web to form a combined web. At 76, the combined web is cut to form signature sheets. The signature sheets are folded at 78 to form signatures of multiple pages having film portions sandwiched therebetween. A plurality of signatures are collated at 80. The collated signatures are bound together to form the publication at 82. The bound, spine edges of the collated signatures may be ground before binding. Further, the outer edges of the collated signature sheets may be trimmed in order to remove excess material.

Figure 8:
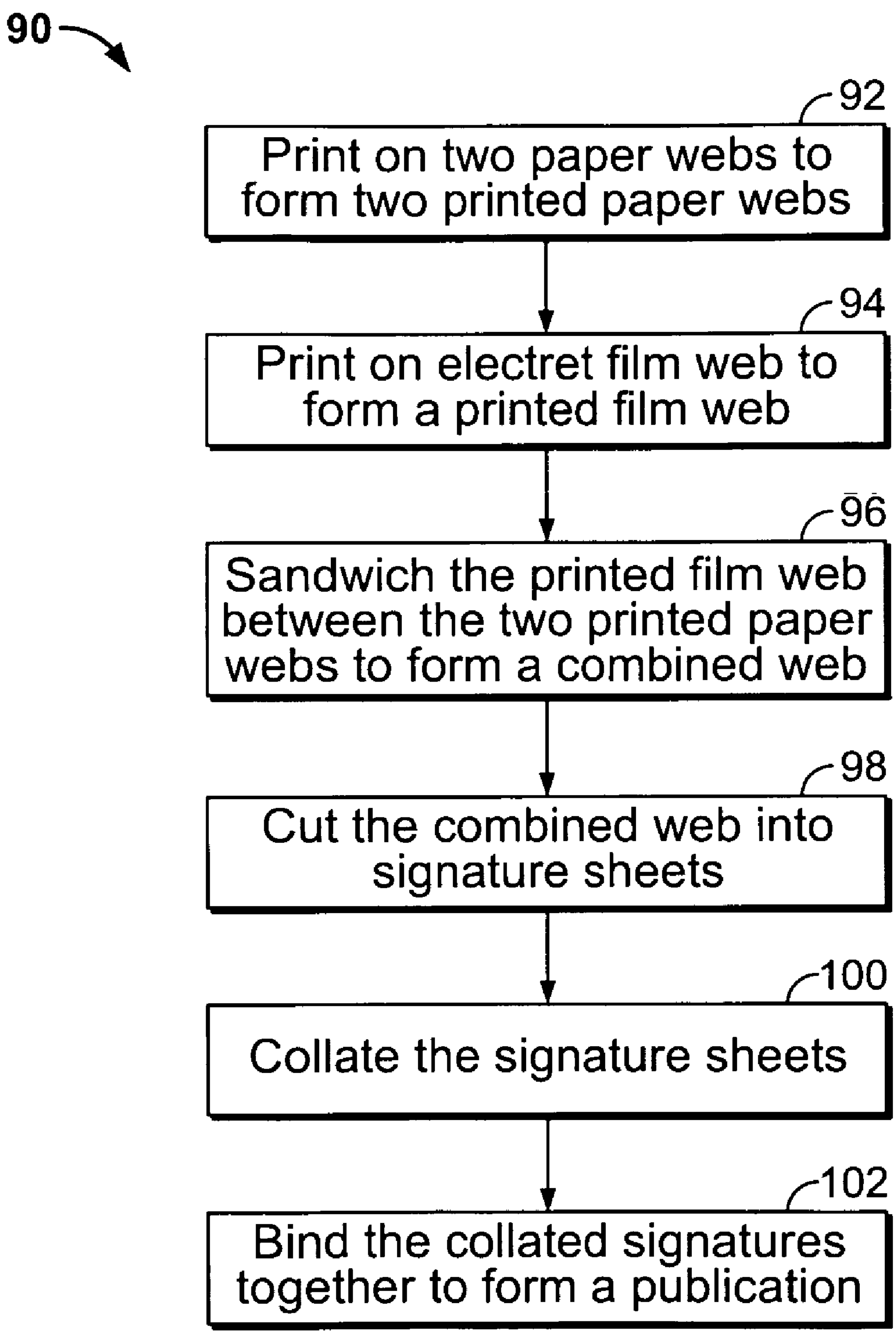
FIG. 8 illustrates a flow chart for a method of manufacturing a publication according to an embodiment of the present invention.

FIG. 8 illustrates a flow chart for a method 90 of manufacturing a publication according to an embodiment of the present invention. At 92, two printed paper webs are formed. That is, two separate printed paper webs are produced. At 94, a printed film web is formed. Next, at 96, the printed film web is sandwiched between the two printed paper webs to form a combined web. At 98, the combined web is cut into signatures or signature sheets. At 100, the signatures or signature sheets are collated. The signature sheets may be folded into signatures prior to collation. Finally, at 102, the collated signatures or signature sheets are bound to form a publication.

Figure 9:
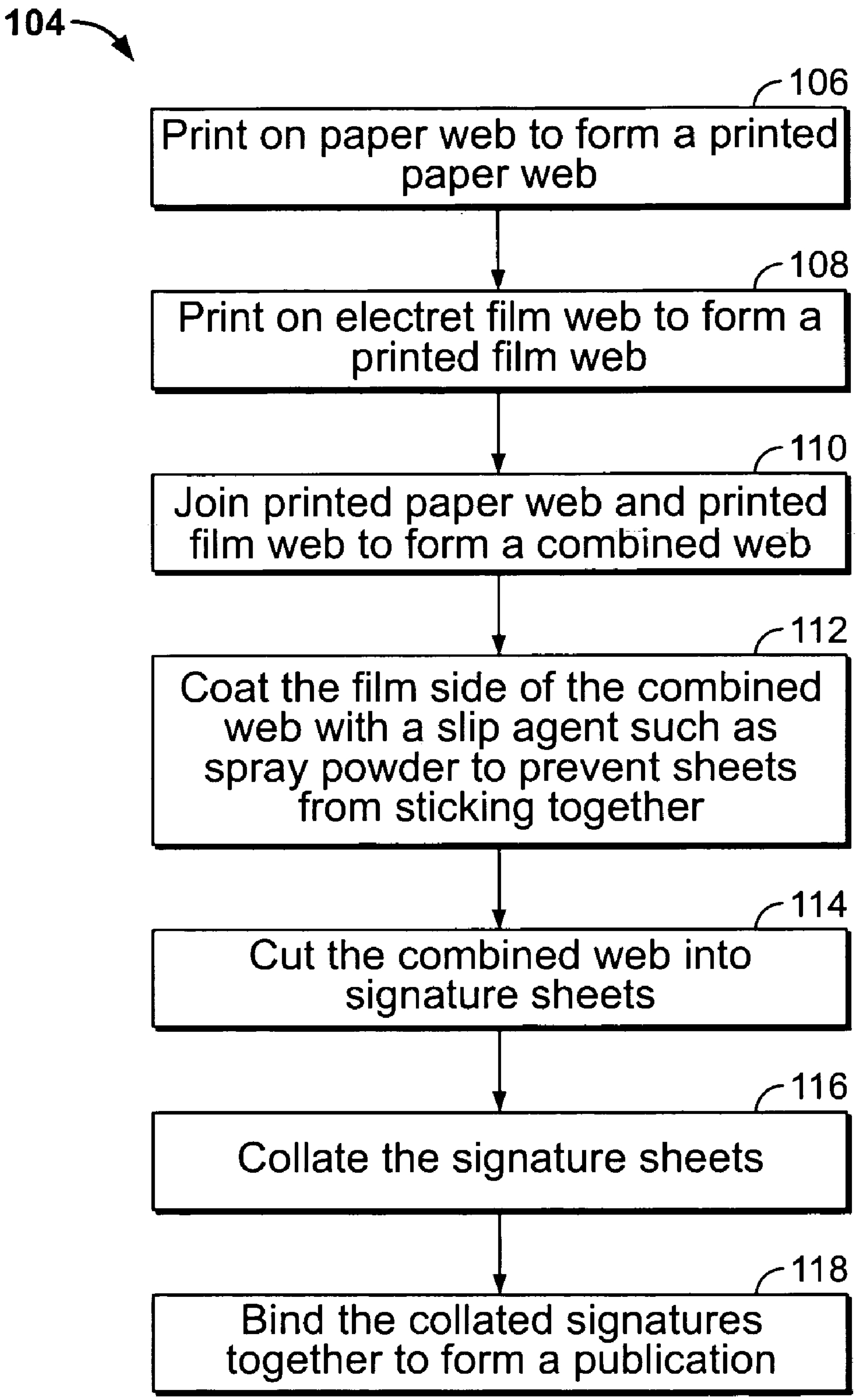
FIG. 9 illustrates a flow chart for a method of manufacturing a publication according to an embodiment of the present invention.

FIG. 9 illustrates a flow chart for a method 104 of manufacturing a publication according to an embodiment of the present invention. A single printed paper web and a single statically-charged film web are formed at 106 and 108, respectively. At 110, the printed paper web and printed film web are joined to form a combined web. At 112, the film side of the combined web is coated with a slip agent such as spray powder to prevent it from sticking to other statically-charged sheets. At 114, the combined web is cut into signatures or signature sheets. At 116, the signatures or signature sheets are collated. The signature sheets may be folded into signatures before collation. Finally, at 118, the signatures or signature sheets are bound together to form a publication.

Figure 10:
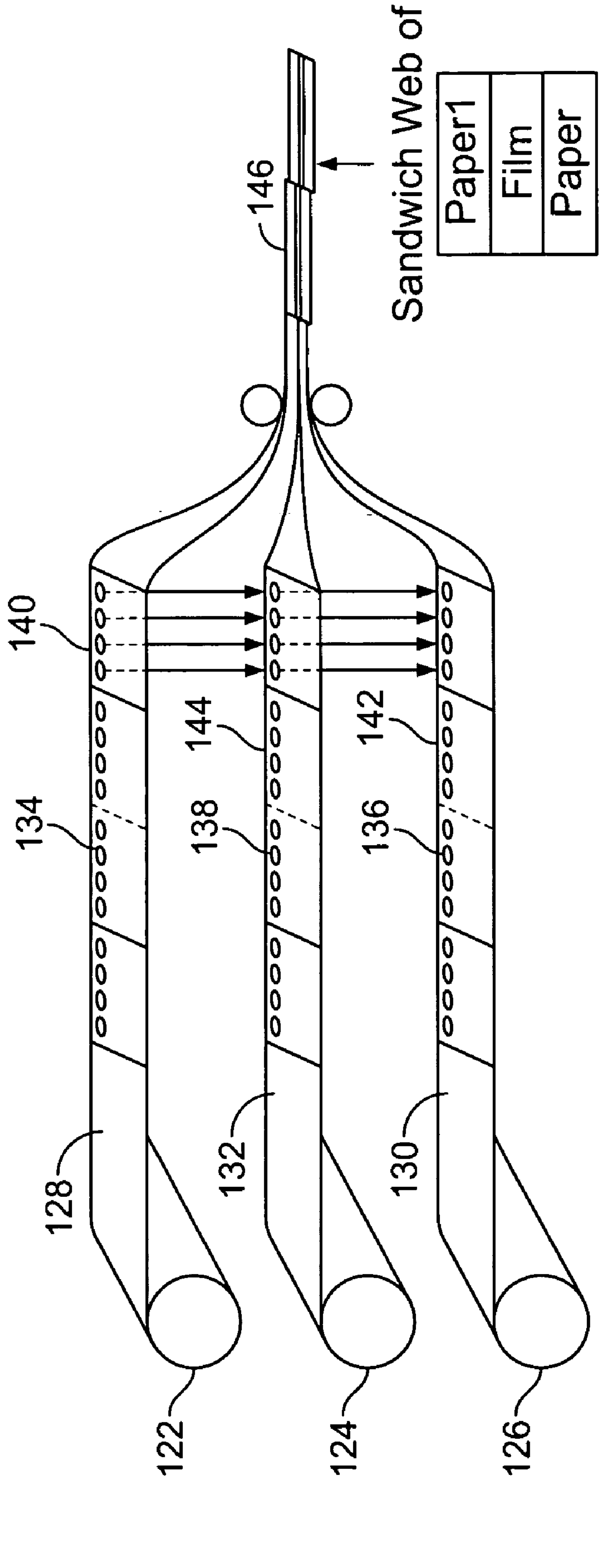
FIG. 10 illustrates a simplified representation of a publication manufacturing system according to an embodiment of the present invention.

FIG. 10 illustrates a simplified representation of a publication manufacturing system 120 according to an embodiment of the present invention. The system includes a first paper roll 122, a statically-charged film roll 124, and a second paper roll 126. Each roll 122, 124, and 126 includes webs that may be printed. Each paper roll 122 and 124 includes paper webs 128 and 130, respectively. Similarly, the statically-charged film roll 124 includes a statically-charged web 132. The statically-charged web 132 is sized similar to the film web discussed above with respect to FIG. 1-6.

Each web 128, 130, and 132 includes punched holes 134, 136, and 138, respectively located proximate edges 140, 142, and 144, respectively. The holes 134, 136 and 138 are punched by a hole punching tool (not shown). The holes 134, 136, and 138 may be punched before or after the webs 128, 130, and 132, respectively are rolled into the rolls 122, 126, and 124 but before the webs 128, 130, and 132 are joined together. The punched holes 134, 136 and 138 enable the webs 128, 130, and 132 to be joined together in exact registration. The combined web 146 includes the film web 132 sandwiched between the paper webs 128 and 130.

Figure 11:
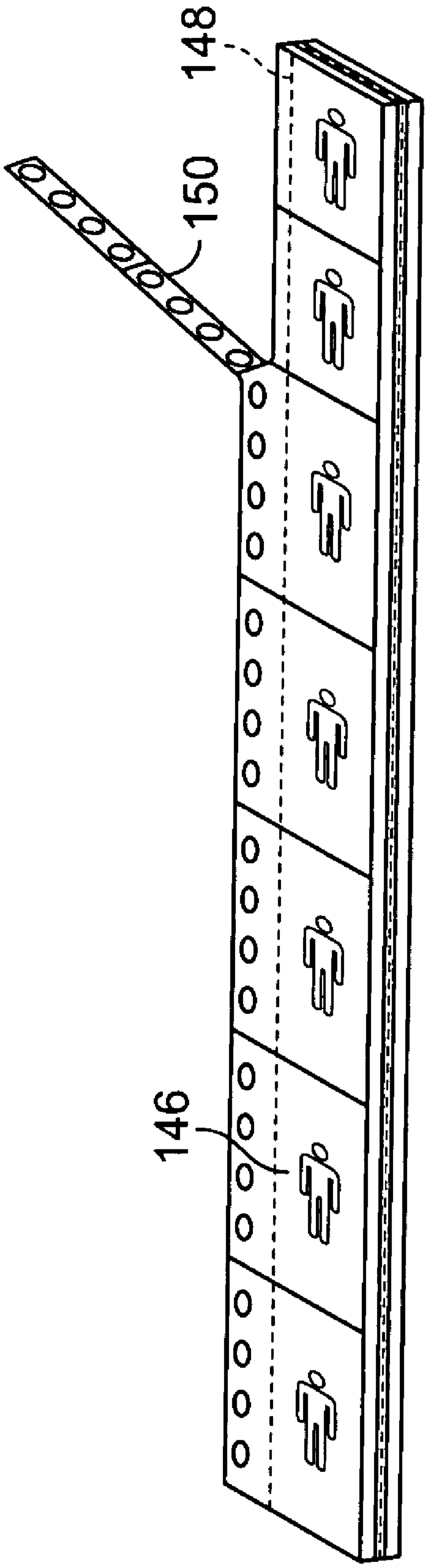
FIG. 11 illustrates a combined web according to an embodiment of the present invention.

FIG. 11 illustrates the combined web 146. Referring to FIGS. 10 and 11, after the three punched webs 128, 130, and 132 are joined together in registration, a glue line 148 is beaded proximate the punched edges 140, 142, and 144. A cutting edge 150 including the punched holes 134, 136, and 138 (as shown in FIG. 10) is removed from the combined web. The combined web 146 is then cut into individual signatures held together by the beaded glue line 148. The beaded glue line 148 is subsequently cut from the signatures when the signatures are bound into a book.

Additionally, once the cutting edge 150 is removed from the combined web 146, a spray powder may be applied to the surface of the combined web 146. The spray powder may be a finely granulated starch that prevents sheets from sticking together.

Figure 12:
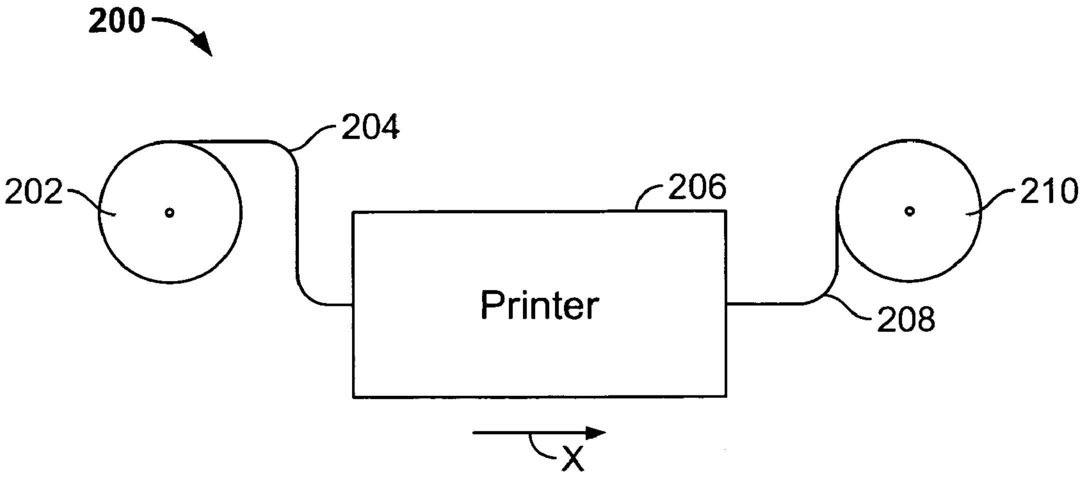
FIG. 12 illustrates a simplified top view of a printing system according to an embodiment of the present invention.

FIG. 12 illustrates a simplified top view of a printing system 200 according to an embodiment of the present invention. The system 200 includes an electrostatic film roll 202 having electrostatic film (such as an electret) 204 that is fed into a printer 206. The film 204 is fed into, and travels through, the printer 206 in the direction of arrow X. The printer 206 prints on the film 200 thereby producing printed film 208 that is rolled onto the printed film web roll 210. The film 204 may be printed on one or two sides and may be electrostatically charged prior to, or after, printing. It has been found that charging the film 204 after printing results in a stronger electrostatic charge on the film 204 due to the fact that applying an ink layer to a previously charged film may reduce the surface charge of the film.

Figure 13:
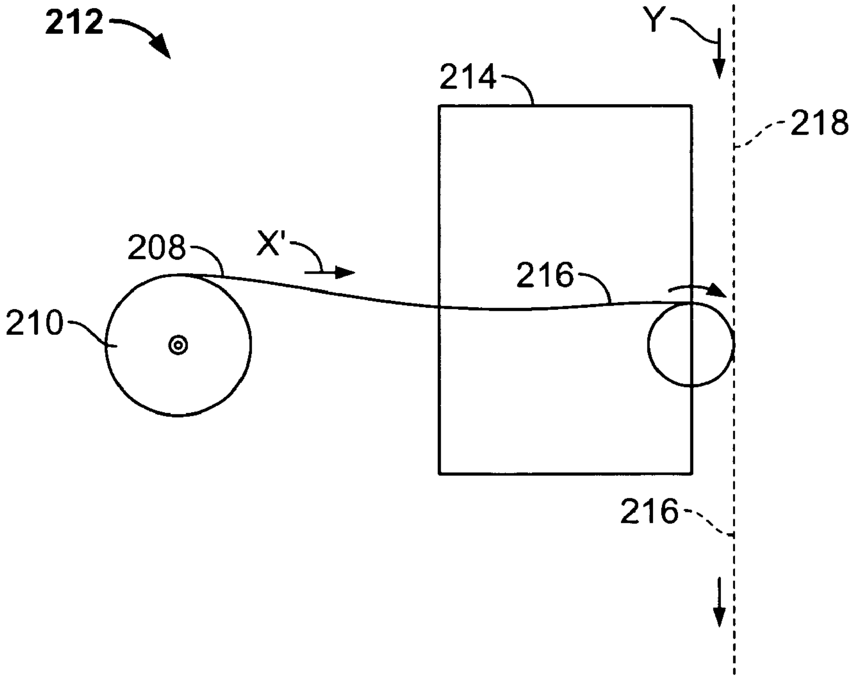
FIG. 13 illustrates a simplified representation of a publication manufacturing system according to an embodiment of the present invention.

FIG. 13 illustrates a simplified representation of a publication manufacturing system 212 according to an embodiment of the present invention. The printed film 208 on the printed film web is fed into a application machine 214 in the direction of arrow X'. The application machine 214 may be an ElectroCard® 3G manufactured by Hurletron, Inc., of Libertyville, Ill. Currently, the Hurletron® ElectroCard® 3G can apply 100,000 pieces per hour to a moving web on high-speed gravure, offset, or newspaper presses. The ElectroCard® 3G attached individual film portions to a moving web at press speed. A thin stream of hot-melt adhesive may be applied as the individual film portions are transported to a register cylinder. A vacuum drum of the ElectroCard® 3G runs at press speed, while a register cylinder runs as approximately ⅓ of the press speed. As such, the perforations connecting the individual film portions together "burst" between a nip wheel and the register cylinder, thereby releasing the pieces to the vacuum drum. Information regarding the ElectroCard® 3G may be found at www.hurletron.com.

The application machine 214 cuts, slices, bursts, or otherwise separates the printed film 208 along perforations into individual film portions 216. The individual film portions 216 are applied to a paper web 218 through a compressive roller 220 that presses, mates, or otherwise places the individual film portions 216 onto the paper web 218 at set intervals. In general, the individual film portions 216 may be placed anywhere on the paper web 218. In particular, each individual film potion 216 may be placed on a corresponding page section of the paper web 218 as to which the particular individual film portion 216 pertains. That is, a particular individual film portion 216 may be an advertisement for a particular business; and it may be placed on a corresponding page section of the film web 218 that corresponds to a phone number, yellow page section, or the like of that particular business. In general, certain embodiments of the present invention place individual film portions 216 over or alongside an advertisement printed on a paper web 218 that eventually becomes a page in a publication.

As shown in FIG. 13, the paper web 218 moves in relation to the application machine 214 in the direction of arrow Y. The individual film portions 216 may or may not be held to the paper web 218 with a removable fugitive glue. The fugitive glue acts to hold the individual film portions 216 to the paper web during subsequent folding, gluing, and trimming operations that occur during publication binding.

Figure 14:
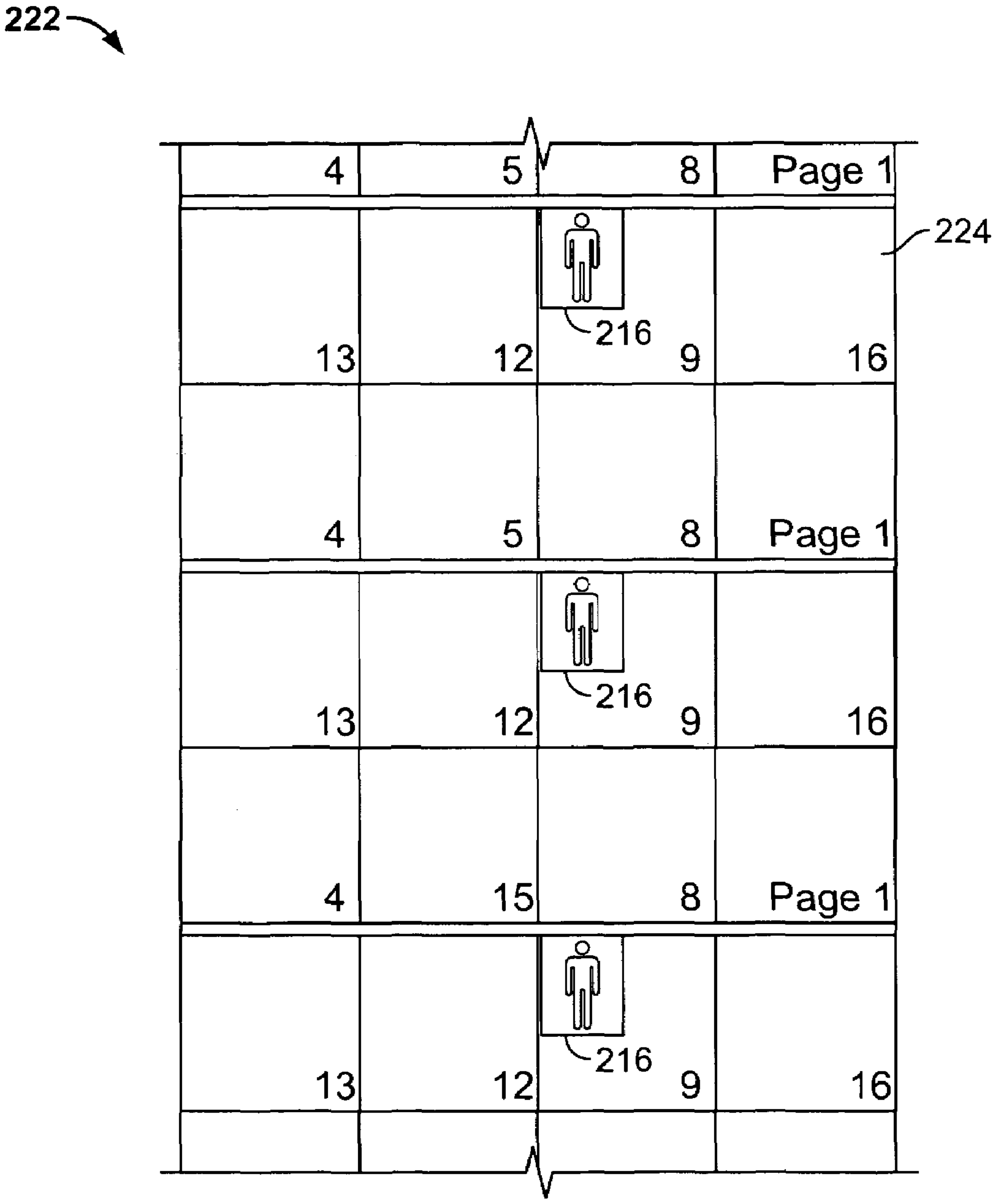
FIG. 14 illustrates a partial plan view of a web signature according to an embodiment of the present invention.

FIG. 14 illustrates a partial plan view of a web signature sheet 222 according to an embodiment of the present invention. The printed charged individual film portions 216 are shown placed on page portions 224 of the signature sheet 222. The cutting process of the system 212 provides the appropriate cutting and placement of the individual film portions 216 on the paper web 218, which is then cut and folded into a plurality of signatures. The individual film portions 216 may be applied in registration anywhere in the publication, thereby allowing advertisers to locate removable advertisements along the side, or on top of the printed paper material. Further, the individual film portions 216 may be sized to cover an entire publication page or just a small portion of the page, thereby reducing the material cost of the statically-charged film without reducing the impact of the advertising piece. Further, the statically-charged film does not need a carrier sheet during the manufacturing process shown and described with respect to FIGS. 12 and 13.

Thus, embodiments of the present invention provide an efficient system and method of manufacturing a publication having removable advertisements or other information. Further, embodiments of the present invention provide a publication having removable advertisements that are adapted to cling or stick to the surface of structures such as walls, desks, refrigerators, and the like.

As discussed above, the formed publication may be a phone book or yellow pages book. However, embodiments of the present invention are not limited thereto. Instead, embodiments of the present invention may be used to form various publications, such as magazines, newspapers, books, and various other such forms of printed material.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of manufacturing a publication comprising:
- uniting a paper web with a film web to form a combined web;
- forming at least one signature sheet from the combined web;
- folding the signature sheet to form a signature, wherein the signature comprises a plurality of pages of the publication with film material formed from the film web sandwiched therebetween;
- forming a thin layer of fugitive glue on the paper web; and
- perforating the film web so that individual portions of the film web are configured to be removed from a main body of the film web.

2. The method of claim 1, wherein the film web is an electret web.

3. The method of claim 1, wherein the paper web is wider than the film web.

4. The method of claim 1, wherein the film web overlays a portion of the paper web to form the combined web.

5. The method of claim 1, wherein the paper web comprises a glue region that is configured for binding the signatures together.

6. The method of claim 5, wherein the film web does not contact the glue region.

7. The method of claim 1, further comprising:
- printing on at least one side of the paper web; and
- printing on at least one side of the film web.

8. The method of claim 1, wherein the film web is thicker than the paper web.

9. The method of claim 1, further comprising applying a layer of spray powder to the film web.

10. The method of claim 1, wherein the film web does not include a carrier sheet.

11. A method of manufacturing a publication comprising:
- sandwiching an electrostatic film web between two paper webs to form a combined web;
- forming at least one signature from the combined web, wherein the signature comprises a plurality of pages of the publication with film material formed from the film web sandwiched therebetween; and
- punching holes in the two paper webs and the film web; and wherein said sandwiching includes registering the film web with the two paper webs through the punched holes.

12. The method of claim 11, further comprising folding at least one signature sheet to form the at least one signature.

13. The method of claim 11, wherein the electrostatic film web is an electret web.

14. The method of claim 11, wherein the paper web is wider than the electrostatic film web.

15. The method of claim 11, further comprising applying glue to a portion of at least one of the paper and electrostatic film webs to form a glue edge; and binding the signature to another signature through the glue edge.

16. The method of claim 11, further comprising defining removable individual electrostatic film portions within the electrostatic film web.

17. The method of claim 11, wherein the electrostatic film web does not include a carrier sheet.

18. A method of manufacturing a publication comprising:

separating an electrostatically-charged film web into individual film portions;

registering the individual film portions with a paper web to form a combined web;

forming at least one signature from the combined web, wherein the signature comprises a plurality of pages of the publication with individual film portions sandwiched therebetween; and defining removable electrostatic units within the individual film portions;

applying a layer of spray powder to the electrostatically-charged film web, and wherein said registering comprises aligning holes formed through the individual film portions with features of the paper web.

19. The method of claim 18, further comprising applying an electrosatic charge to a film web to produce the electrostatically-charged film web, wherein said applying occurs after a printing process.

20. A method of manufacturing a publication comprising:

sandwiching an electrostatic film web between two paper webs to form a combined web;

forming at least one signature from the combined web, wherein the signature comprises a plurality of pages of the publication with film material formed from the film web sandwiched therebetween; and applying a layer of spray powder to the electrostatic film web.

* * * * *